United States Patent
Bosnjakovic et al.

(10) Patent No.: US 8,121,609 B2
(45) Date of Patent: Feb. 21, 2012

(54) SYSTEM AND METHOD FOR DETERMINING THE LOCATION OF A LOCATION TRACKING DEVICE

(75) Inventors: Miroslav Bosnjakovic, Oakville (CA); Nenad Lazovic, Toronto (CA)

(73) Assignee: Worldscout Corporation (CA)

( * ) Notice: Subject to any disclaimer, the term of this patent is extended or adjusted under 35 U.S.C. 154(b) by 1110 days.

(21) Appl. No.: 11/617,467

(22) Filed: Dec. 28, 2006

(65) Prior Publication Data

US 2010/0035630 A1 Feb. 11, 2010

(51) Int. Cl.
*H04Q 7/20* (2006.01)
(52) U.S. Cl. .................... 455/456.1; 455/456.2; 455/457
(58) Field of Classification Search ............... 455/456.1, 455/456.2, 457
See application file for complete search history.

(56) References Cited

U.S. PATENT DOCUMENTS 6,026,304 A * 2/2000 Hilsenrath et al. ......... 455/456.2

FOREIGN PATENT DOCUMENTS

| GB | 2359699 A | 8/2001 |
| GB | 2386014 A | 9/2003 |
| WO | 2004/097446 A2 | 11/2004 |

OTHER PUBLICATIONS

Notification of Transmittal of the International Search Report and the Written Opinion of the International Searching Authority or the Declaration for International Application No. PCT/CA2007/002376; mailed Apr. 21, 2008; 3 pages.
International Search Report and Written Opinion, in co-pending PCT Application No. PCT/CA2007/002376; mailed Apr. 21, 2008; 8 pages.

* cited by examiner

*Primary Examiner* — Charles Shedrick
(74) *Attorney, Agent, or Firm* — Katten Muchin Rosenman LLP

(57) ABSTRACT

A system and method for determining the location of a location tracking device employs a satellite based location determining infrastructure and a wireless data communications network. A location tracking device which cannot easily obtain valid ephemeris data from the satellite based location determining infrastructure requests the necessary data from a data set stored at a tracking device hub via the wireless communications network. The tracking device hub determines and transmits an estimated position of the location tracking device to the location tracking device, along with the appropriate required valid ephemeris data, to allow the location tracking device to determine its location. If the location tracking device is still unable to make a location determination from the satellite based location determining infrastructure, then the estimated location can be provided. The base station topography is self-determined by a process executing in the system and can include base stations from different networks.

21 Claims, 4 Drawing Sheets

SYSTEM AND METHOD FOR DETERMINING THE LOCATION OF A LOCATION TRACKING DEVICE

FIELD OF THE INVENTION

The present invention relates to a system and method of determining the location of a location tracking device. More specifically, the present invention relates to a system and method for assisting a location tracking device, which primarily employs one location technology, such as the GPS system or the like, to determine its location in circumstances wherein the reception of signals from that location technology is impaired.

BACKGROUND OF THE INVENTION

Location tracking devices are well known and operate to provide a signal, indicating their present location, to a receiver at a remote location. Location tracking devices can be used, for example, to locate: vehicles, for fleet management, loss prevention, etc.; cargo, for logistics and loss prevention; people, for security and manpower management, etc.

Location tracking devices typically comprise a small device which includes location determination circuitry and radio transceiver circuitry to report the location determined by the location determination circuitry to a receiver at a remote location. Early location tracking devices generally employed radio direction finding (RDF) or similar technologies as the location determination circuitry while, more recently, most location tracking devices employ signals from a satellite-based positioning system, such signals from the Global Positioning System (GPS).

Location tracking systems employing satellite-based positioning are typically much preferred over systems employing other location determination technologies due to the accuracy which can be obtained with GPS and/or other satellite-based systems and due to the fact that, unlike RDF-based systems, the GPS infrastructure (the constellation of GPS satellites and related ground systems) is maintained and operated at no direct cost to entities which use it.

While GPS and other satellite-based systems offer many advantages over RDF-based or other location technologies, they do suffer from disadvantages in that, due to the high radio frequencies and relatively low power levels at which the signals are transmitted, reception of signals from the satellites at a receiver is easily compromised by obstructions such as geographic features, buildings, trees, etc.

To determine a location, a GPS receiver must have current almanac data and ephemeris data for at least three appropriate (depending upon their location relative to the GPS receiver) satellites and the receiver must have an initial estimate of its location.

Each GPS satellite broadcasts the almanac data for the entire GPS system and each GPS satellite broadcasts its own ephemeris data. One of the disadvantages of the GPS system is that almanac data and ephemeris data is transmitted from the GPS satellites at a relatively low data rate and thus a GPS receiver needs to receive the GPS satellite signals, uninterrupted, for a relatively long time to obtain the required almanac data and ephemeris data.

While GPS receivers store their last received almanac data and ephemeris data, and while almanac data is valid for relatively long periods of time, ephemeris data is valid for much shorter time periods. A GPS receiver which experiences intermittent or poor reception of signals from one or more GPS satellites may not be able to obtain the required ephemeris data, even though the GPS receiver does have sufficient signal reception to receive the other GPS satellite data required for location determination purposes. As location tracking devices are often operated in environments, such as cityscapes and urban areas, wherein GPS signal reception will be intermittent, this can result in poor performance of the location tracking system.

To address the weakness of GPS-based location tracking devices, a variety of enhancements generally referred to as Assisted GPS (AGPS) have been developed. In AGPS systems, ephemeris and/or almanac data is received at an infrastructure station, in the geographic area in which the location system is operating, which is expected to have good satellite signal reception. This received ephemeris and/or almanac data is then transmitted, via another non-satellite radio communication system (typically a cellular network data communication systems, such as GPRS), to the location tracking devices served by the infrastructure station which require up to date ephemeris data.

Thus, in an AGPS system, the necessary ephemeris and almanac data can be provided to the AGPS-based location tracking devices from the infrastructure station via a faster and/or more robust communication channel, increasing the probability that the AGPS-based location tracking device can make a valid location determination.

However, both GPS and AGPS-based location tracking devices still suffer from a problem in that, in addition to valid ephemeris and almanac data and reception of GPS satellite signals, a GPS receiver must also have an initial location position estimate to determine an actual location. The more accurate the initial location position estimate employed by the GPS receiver, the more quickly the actual location can be determined. Conversely, an inaccurate initial location position estimate can significantly increase the time required to determine an actual location and, in cases wherein intermittent reception of the GPS satellite signals is experienced, may prevent a location determination from being achieved.

While GPS and AGPS receivers typically store their last determined location and employ that as the initial location position estimate, it is not uncommon that a receiver has been moved a significant distance since it last determined a location and thus this initial location position estimate can be a very poor one.

SUMMARY OF THE INVENTION

It is an object of the present invention to provide a novel system and method for determining the location of a location tracking device.

According to a first aspect of the present invention, there is provided a method for determining the location of a location tracking device which employs a satellite-based positioning system, when the location tracking device does not have at least some of the data required from the satellite-based positioning system to determine a location, comprising the steps of: (i) the location tracking device sending a request to a remote data device, via a wireless data communication link provided by a radio data communications network, the request including a set of identifiers and respective time delay data for a selected number of wireless network base stations which the location tracking device can receive signals from; (ii) the remote data device receiving, via the wireless data communication link, the request from the location tracking device and processing the set of identifiers and time delay data against a determined topography of radio data communication network base stations to determine an estimated location of the wireless location tracking device; (iii) the remote data device selecting, based upon the estimated location, a set of appropriate data for the location tracking device to determine a location with the satellite-based positioning system, and transmitting to the location tracking device, via the wireless data communications link, the estimated location and the set of appropriate data; (iv) the location tracking device receiving, via the wireless data communications link, and employing the estimated location and the set of appropriate data to receive appropriate signals from the satellite-based positioning system to determine the location of the location tracking device.

Preferably, if at step (iv) the location tracking device cannot determine its location from the satellite-based positioning system, the estimated location created at step (ii) is used as the location of the location tracking device.

Also preferably, the determined topography is created by receiving location information from at least one location tracking device, the location information including the location of the location tracking device as determined from signals from the satellite-based positioning system and a set of identifiers and respective time delay data for a selected number of radio data communication network base stations which the location tracking device can receive signals from, the topography being determined by processing this information to determine the locations of the radio data communication network base stations.

According to another aspect of the present invention, there is provided a system for determining the location of a location tracking device which employs a satellite-based positioning system, the system comprising: a plurality of location tracking devices, each location tracking device including a receiver for a satellite-based positioning system and a transceiver for a radio data communications network; and a tracking device hub, the hub including: a data connection to the radio data communication network to allow communication between the tracking device hub and each of the plurality of location tracking devices; storage of data from the satellite-based positioning system, the stored data being useful to the location tracking devices to determine their locations from the satellite-based location system; a determined topography of base stations of the radio data communication network; and processing means responsive to time delay data received from a location tracking device to determine from the developed topography an estimated position for the location tracking device.

The present invention provides a system and method for determining the location of a location tracking device. The system and method employ satellite-based positioning system infrastructure, such as the GPS system, and a wireless data communications network such as a cellular voice and/or data network such as GSM/GPRS. A location tracking device which cannot easily obtain valid ephemeris data, or the like, from the satellite based location determining infrastructure requests the necessary data from a data set stored at a tracking hub or the like, via the wireless communications network.

In the request, the location tracking device includes identifiers for each base station of a radio data communications networks which it can receive data from and respective time delay data for those base stations. The tracking hub analyzes the included time delay data for each identified base station, with the assistance of a determined topography for those base stations, to determine an estimated position of the location tracking device. This estimated location is transmitted to the location tracking device, along with the appropriate required valid ephemeris data, or the like, to allow the location tracking device to determine its location.

A feature of the present invention which is believed to be particularly advantageous is that the topography of the radio data communications network base stations is self-determined by a process executing in the system and can include base stations from networks operated by different network operators. The topography can be updated continuously, or at selected intervals, to provide a desired degree of currency and accuracy.

The present invention does not require any special equipment to be installed at the base stations of the radio data communications network and is not limited to the use of base stations of any particular service provider and conventional roaming services can allow the present invention to be operated over large geographic areas including substantially global areas.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
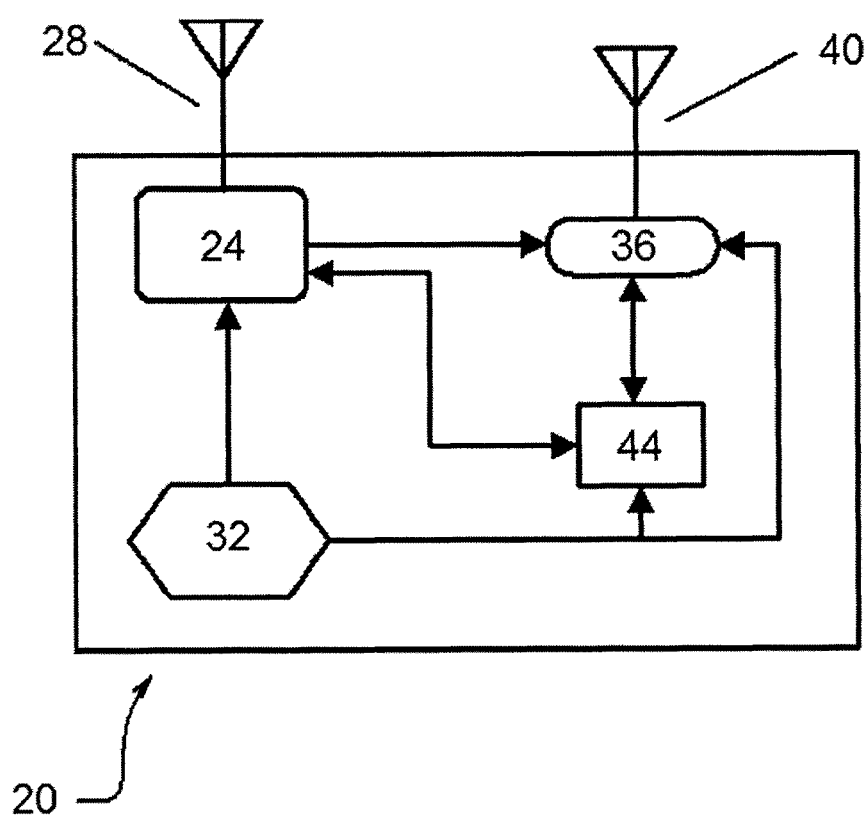
FIG. 1 shows a schematic representation of a location tracking device in accordance with the present invention.

A location tracking device in accordance with the present invention is indicated generally at 20 in FIG. 1. Device 20 includes a GPS receiver 24 which is operable to receive and process signals from a satellite-based positioning system, such as the satellites of the GPS system to determine the location of device 20. GPS receiver 24 is connected to an antenna 28, which can be a microstrip or other antenna suitable for receiving GPS signals, and to a power supply 32, which can be a battery or other suitable power supply.

Device 20 further includes a data transceiver 36, such as a General Packet Radio Service (GPRS) transceiver which is connected to a suitable antenna 40. Antenna 40 can be part of antenna 28 or can be a separate antenna structure.

Transceiver 36 is operable to receive from a remote station data representing commands, etc. and to send data from device 20 to the remote station. The transmitted data can represent, without limitation, the location of device 20, the operational status of device 20, acknowledgements of received commands, predefined alarm signals from device 20, etc.

In the specific case of transceiver 36 being a GPRS transceiver, data is received and transmitted in packets to the remote station through a GPRS network to which the remote station is connected. Transceiver 36 is not limited to being a GPRS transceiver and, as will be apparent to those of skill in the art, transceiver 36 can be a transceiver for any appropriate data communication system including, without limitation, EVDO, EDGE, 802.16x, etc.

Device 20 further includes a microcontroller 44 which executes a stored program and which controls the operation of device 20, including the functioning of GPS receiver 24 and transceiver 36 and can also control tasks such power management of power supply 32. Microcontroller 44 can also execute a variety of applications to provide functionalities such as so called "geo-fence" (described below) or other user applications which can compare data such as the determined location of the device, the velocity of the device, etc. to predefined criteria and which can result in the transmission of appropriate signals, alerts or alarms to a remote station or user.

While in FIG. 1 GPS receiver 24, data transceiver 36 and microcontroller 44 are illustrated as being separate components, it will be understood by those of skill in the art that this is merely for illustrative purposes and that components which combine the functionality of two or more of GPS receiver 24, data transceiver 36 and microcontroller 44 are available from various vendors.

For example, a present embodiment of the invention employs an iTrax03/16™ GPS module, manufactured by Fastrax™, Valimotie 7, 01510 Vantaa, Finland, which comprises GPS receiver 24 and microcontroller 44. Data transceiver 36 (in the form of a GSM/GPRS transceiver) is an Enabler™ IIg module, manufactured by Enfora™, 661 E. 18$^{th}$ Street, Plano, Tex., USA, 75074 but the present invention is not limited to any particular architecture for device 20.

Similarly, while much of the discussion herein centers on GPS location technologies, the present invention is not so limited and other satellite-based positioning systems and/or technologies can be employed, such as the proposed GALILEO location system being implemented by European states.

Figure 2:
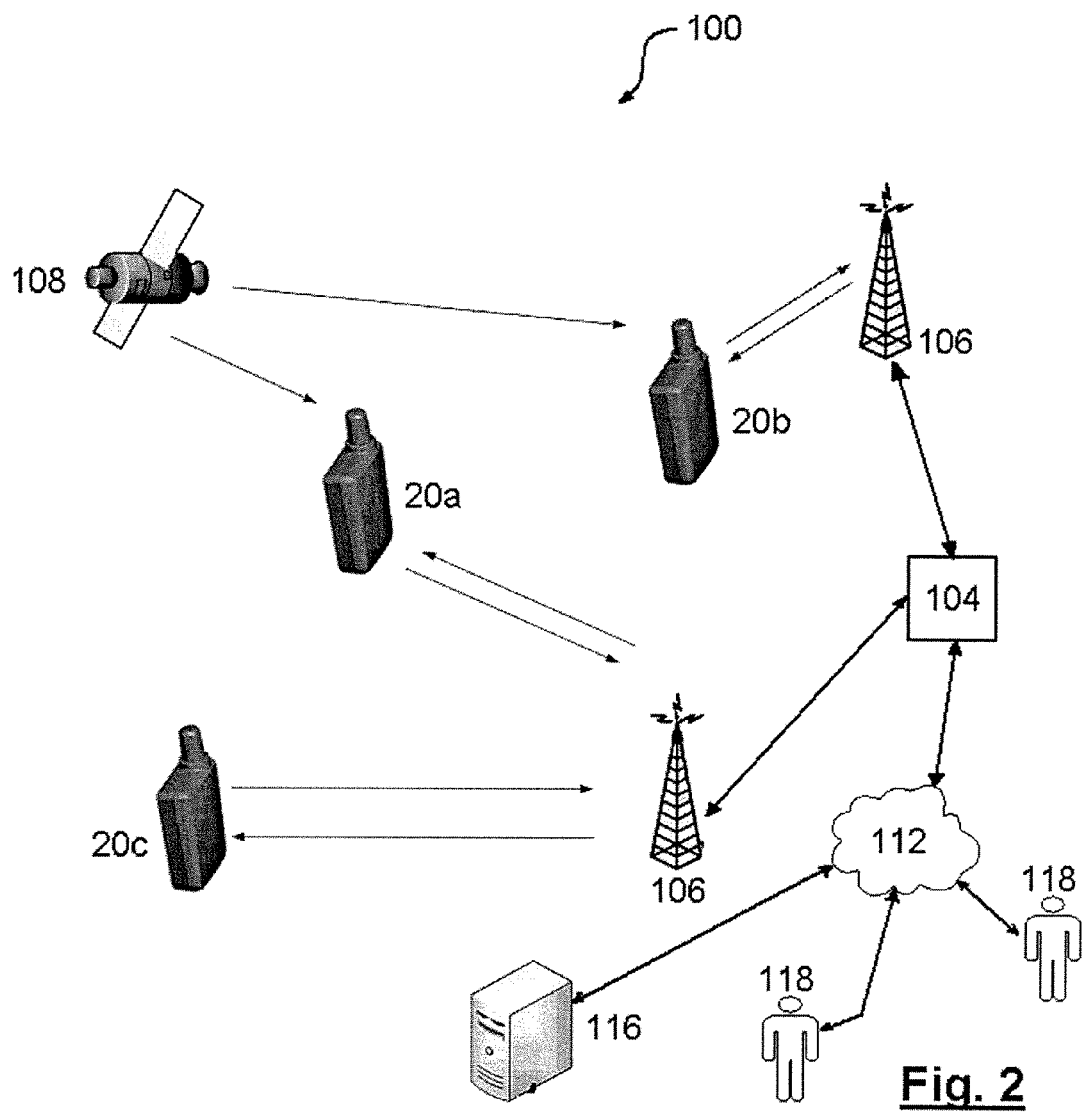
FIG. 2 shows a schematic representation of a location tracking system in accordance with the present invention.

FIG. 2 shows a location tracking system 100 in accordance with the present invention. System 100 includes a plurality of location tracking devices, in this example devices 20a, 20b, and 20c. System 100 employs a radio data communications network, such as a wireless data communications network 104 (in this example a GPRS/GSM network or a CDMA network, such as a Qualcomm EVDO network) and one or more of its associated base stations 106. While GPRS or EVDO networks are presently preferred, due to the lower costs generally associated with their use, the data carrying capacity of GSM or CDMA networks can instead be employed with the present invention by, for example, transmitting data in SMS text messages or the like. System 100 also employs location system satellites, such as GPS satellites 108 and their associated systems.

The wireless data communication network 104 is connected, via a second data communication network 112 such as the Internet or a direct data connection, to a location tracking device hub 116. Tracking device hub 116 can be one or more general purpose computing devices, such as a personal computer, which execute, amongst other processes, a position estimating system (described below), a database application and communications applications allowing each location tracking device 20 to communicate with other tracking devices 20 in system 100 and with authorized end users 118 wishing to be advised of the determined location of one or more of devices 20.

An authorized end user 118 wishing information from a location tracking device 20 communicates with that location tracking device 20 via tracking device hub 116, which authenticates the end user 118 using any appropriate authentication technology as will occur to those of skill in the art, and which acts as a hub transferring commands and data between the authorized end user 118 and location tracking device 20 via wireless data communication network 104 and second data communication network 112.

Authorized users 118 can issue a variety of commands to respective ones of location tracking devices 20. In a present embodiment of the invention, tracking devices 20 can be configured, via commands from authorized users 118, to: report their locations, status and/or other information at regular intervals; report their locations, status and/or other information when commanded by an authorized user 118; to report their locations, etc. upon occurrence of a specified event, such as the location tracking device 20 moving outside of a predefined area; etc.

The reported location can be stored at tracking device hub 116 and/or can be forwarded to the authorized end user 118. Such authorized end users 118, such as clients of location tracking system 100, can use any suitable means, such as an html/web interface, smartphone, etc. to obtain desired determined locations for location tracking devices 20 via tracking device hub 116.

In the illustrated example of FIG. 2, it is assumed that location tracking devices 20a and 20b have relatively unimpeded reception of transmissions from GPS satellites 108 and to and from wireless data communication network 104. Devices 20a and 20b thus have current almanac and ephemeris data from an appropriate set of GPS satellites 108 and devices 20a and 20b have determined their respective locations which can be reported to an interested authorized end user 118.

In the example of FIG. 2, unlike location tracking devices 20a and 20b, it is assumed that location tracking device 20c has unimpeded communication to and from wireless data communication network 104 but is experiencing impeded reception of signals from GPS satellites 108. Thus location tracking device 20c does not have valid ephemeris data to use to receive and accurately process signals from GPS satellites 108.

In a conventional system, location tracking device 20c would thus be unable to determine its location, even though it may have sufficient reception of the other (non-ephemeris) signals from GPS satellites 108 to determine its location if it had valid ephemeris data.

Further, in a conventional system, once the state of location tracking device 20c improves such that is has sufficient reception of transmissions from GPS satellites 108 to receive the ephemeris data, tracking device 20c will still have to first receive that ephemeris data from each of a set of three or more GPS satellites 108 before it can begin receiving and processing the other GPS signals to determine its location.

This need to receive the ephemeris data, which transmission occurs at a relatively slow rate set by the GPS system, from several satellites (typically a minimum of three) can result in a significant delay before location tracking device 20c can determine and provide its location to an authorized end user 118.

However, in the present invention tracking device hub 116 receives a copy of the current ephemeris data for each satellite visible to location tracking devices 20 in the geographic area served by tracking device hub 116 (which can be a substantially global or smaller geographic area) from one or more location tracking devices 20 and tracking device hub 116 stores that current ephemeris data for each satellite 108. Current ephemeris data can thus be supplied to location tracking device 20c, or to any other location tracking device 20 which requires it, from tracking device hub 116 via wireless data communication network 104 and the transfer of the ephemeris data over wireless data communication network 104 can be achieved at a much faster rate that the ephemeris data can be downloaded from GPS satellites 108.

As is discussed above, to determine an initial location, after being first activated or re-activated, or after re-obtaining reception of GPS satellite signals after some period of non-reception, tracking devices 20 also require an initial location estimate. In the present invention, this initial location estimate is provided by performing an analysis of the location of the tracking device 20 with respect to the positions of base stations 106.

As will be apparent to those of skill in the art, when tracking device 20 employs GPS/GPRS as its communication protocol to communication with wireless data communication network 104, part of the information provided to a tracking device 20 by each base station 106 it can receive is a time delay value which is used to correct the timing of the transmission and receive slots of the base station 106 for the distance of the mobile unit (in this case tracking device 20) from the base station 106.

While it is presently preferred that the present invention employ a time division duplexed (TDD) or hybrid frequency division duplex/time division duplex (FDD/TDD) wireless communication network 104, such as a GSM/GPRS network, the present invention is not so limited and networks which employ other multiplexing systems can also be employed with the present invention. For example, with CDMA networks time delay information is not generally available to location tracking devices 20 but other information, such as signal strength/loss information can be available and can be used to estimate the distance between the location tracking device 20 and a base station 106.

Therefore, as used herein the term "time delay data" is intended to encompass any data, time delay or otherwise, which is available from a base station 106 or other part of wireless communication network 104 and which can be used to estimate the distance between a location tracking device 20 and a base station 106. It is also contemplated that location tracking devices 20 can include more than one transceiver 36, each of which can receive signals from wireless communications networks 104 networks employing different multiple access methods (GPRS and CDMA), or a single transceiver 36 which can receive signals from such networks employing different multiple access methods. Thus, if in a particular location required time delay data is not available from one network 104 it may be obtained from another network 104.

Accordingly, each tracking device 20 can report to tracking device hub 116 the list of base stations 106 whose signals it is receiving and the respective time delay data values it has been provided by, or has derived from, each of those base stations 106.

As will be apparent to those of skill in the art, provided that the locations of base stations 106 are known, it is a relatively simple manner to derive a good estimate of the location of a location tracking device 20 from the list of base stations 106 and their respective time delay data values provided to tracking device hub 116 by a tracking device 20.

The process of determining such location estimates can be performed by a process executing on tracking device hub 116, or a process executing on another general purpose or other computing device (not shown) communicating with tracking device hub 116.

As mentioned above, to determine location estimates from the base station time delay data, it is necessary to know the location of base stations 106. As system 100 may compete with services offered by the operator of wireless communications network 104, or for security reasons, the location data for base stations 106 may not be directly available.

While in other circumstances the operator/service provider of wireless communications network 104 may make this location data available, it is contemplated that there may often be a licensing or other fee required for access to this data. Further, as many wireless communication networks are in a constant state of modification and alteration, such data from an operator/service provider may always be out of date to some extent.

Further still, even if up to date data can be obtained at a reasonable cost, it is well known that more accurate estimates of the location of a tracking device 20 will be obtained if more sets of time delay/base station data are available for the tracking device 20. In other words, if a location tracking device 20 can report that it is receiving signals from six base stations 106 and provide the respective time delay data, a more accurate estimate of the location of the location tracking device 20 can be obtained than if the location tracking device 20 can only report that it is receiving signals from three base stations 106.

Accordingly, in the preferred embodiment of the present invention, system 100 operates to self-determine the location of base stations 106. Specifically, a selected number of location tracking devices 20 can be commanded to, when they have valid GPS-derived determined locations, report: that GPS-determined location; a suitable identifier for each base station 106 that they are receiving signals from; and the respective time delay data provided by, or derived from, those base stations 106. This data is accumulated at tracking device hub 116, or at another computing device (not shown) communicating with tracking device hub 116, and is processed to develop a topography indicating determined locations of the base stations 106 in an area served by system 100.

The particular algorithm used to develop the topography is not particularly limited and suitable algorithms from astrophysics, signal processing and other disciplines will be apparent to those of skill in the art.

It is contemplated that, as system 100 is deployed in a new geographic area, the operator of system 100 will arrange to have a number of location tracking devices 20 moved through and about the new geographic area. These location tracking devices 20 will be commanded to transmit, at a predefined interval, their GPS-determined location, a suitable identifier for each base station 106 that they are receiving signals from and the respective time delay data provided by those base stations 106. In this manner a relatively accurate topography can be determined in a relatively short period of time (for example, over a few days).

Alternatively, location tracking devices 20 can be first deployed in the new geographic area for which the topography of base stations 106 is not known and those location tracking devices can transmit their GPS-determined location, a suitable identifier for each base station 106 that they are receiving signals from and the respective time delay data provided by those base stations 106 at various times so that a suitable topography can be developed on an ad-hoc basis. While this alternative is less desired, as it limits the accuracy with which estimates of initial locations for tracking devices 20 can be provided until the topography is developed in sufficient detail and accuracy, system 100 will still operate correctly while the topography is being developed.

The development of the topography of base stations 106 is preferably conducted on an ongoing basis. In this manner, refinements can be continually applied to the developed topography and the inevitable changes which occur, due to the addition and/or removal of base stations 106, etc., will be reflected in the topography in a timely manner.

Accordingly, it is contemplated that various location tracking devices 20 operating in a geographic area will be commanded to, at various times, transmit their GPS-determined location, a suitable identifier for each base station 106 that they are receiving signals from and the respective time delay data provided by those base stations 106 and this data will be used to update or correct the developed topography on an on-going basis. In a present embodiment of the invention, whenever a location tracking device 20 is requested to transmit its location, it also transmits a suitable identifier for each base station 106 that the location tracking device 20 is receiving signals from and the respective time delay data provided by, or derived from, those base stations 106.

One of the particular perceived advantages of the self-determination of the topography of base stations 106 described above is that the present invention is not limited, in the estimation of initial locations, to the use of base stations 106 of any one operator of a wireless communications network 104. In the present invention, the developed topography includes each base station 106 from which location tracking devices 20 can receive base station identification information and time delay information. As such identification and time delay information is typically available from each network 104 to allow for roaming services between networks 104 operated by different operators, the self-determined topography of the present invention will generally include base stations 106 of two or more wireless communications networks 104 belonging to different operators.

Further, if data transceiver 36 is capable of receiving time delay data from radio data communication networks which employ different multiplexing strategies, or communication standards, then the developed topography can include base stations for such networks.

The ability of system 100 to develop a topography including base stations 106 from different networks 104 allows system 100 to be employed in wide geographic areas throughout which no single service provider may operate. Further, in areas where service providers offer competing services, the same geographic area will have base stations 106 for two or more service providers.

Figure 3:
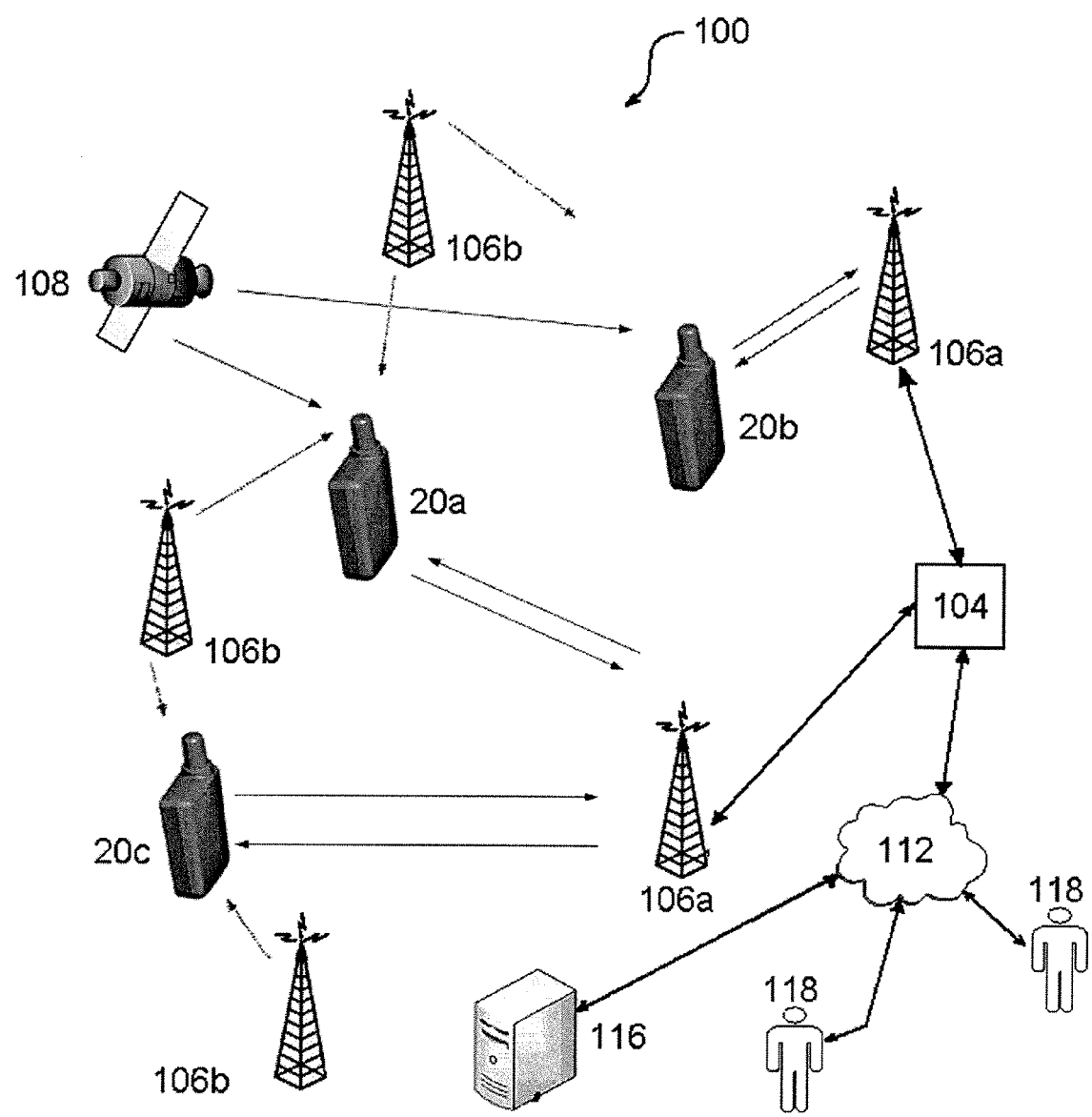
FIG. 3 shows a schematic representation of another location tracking system in accordance with the present invention.

FIG. 3 shows an area served by two wireless communication networks 104 made up of base stations 106a of one service provider and base stations 106b of another service provider. In FIG. 3, system 100 operates with data communications network 104 and its associated base stations 106a with which location tracking devices 20 communicate. In this case, provided only that location tracking devices 20 are operable to receive signals from base stations 106b of such additional radio communication network, location tracking devices 20 can report to tracking device hub 116 the base stations 106a and 106b which location tracking devices 20 can receive signals from and the respective time delay data.

Thus, system 100 can develop and employ a finer grained topography including base stations 106 from a variety of networks 104 and, by having and employing the location of base stations 106 of more than one network 104, system 100 can provide better estimates of the position of location tracking devices 20.

While the developed topography of base stations 106 is useful in providing estimates of initial position for location tracking devices 20, it is also contemplated that this topography can have other commercial value which the operators of system 100 may be able to profit from and it is contemplated that the developed topography can be licensed to third parties or otherwise commercially exploited in other manners.

Figure 4:
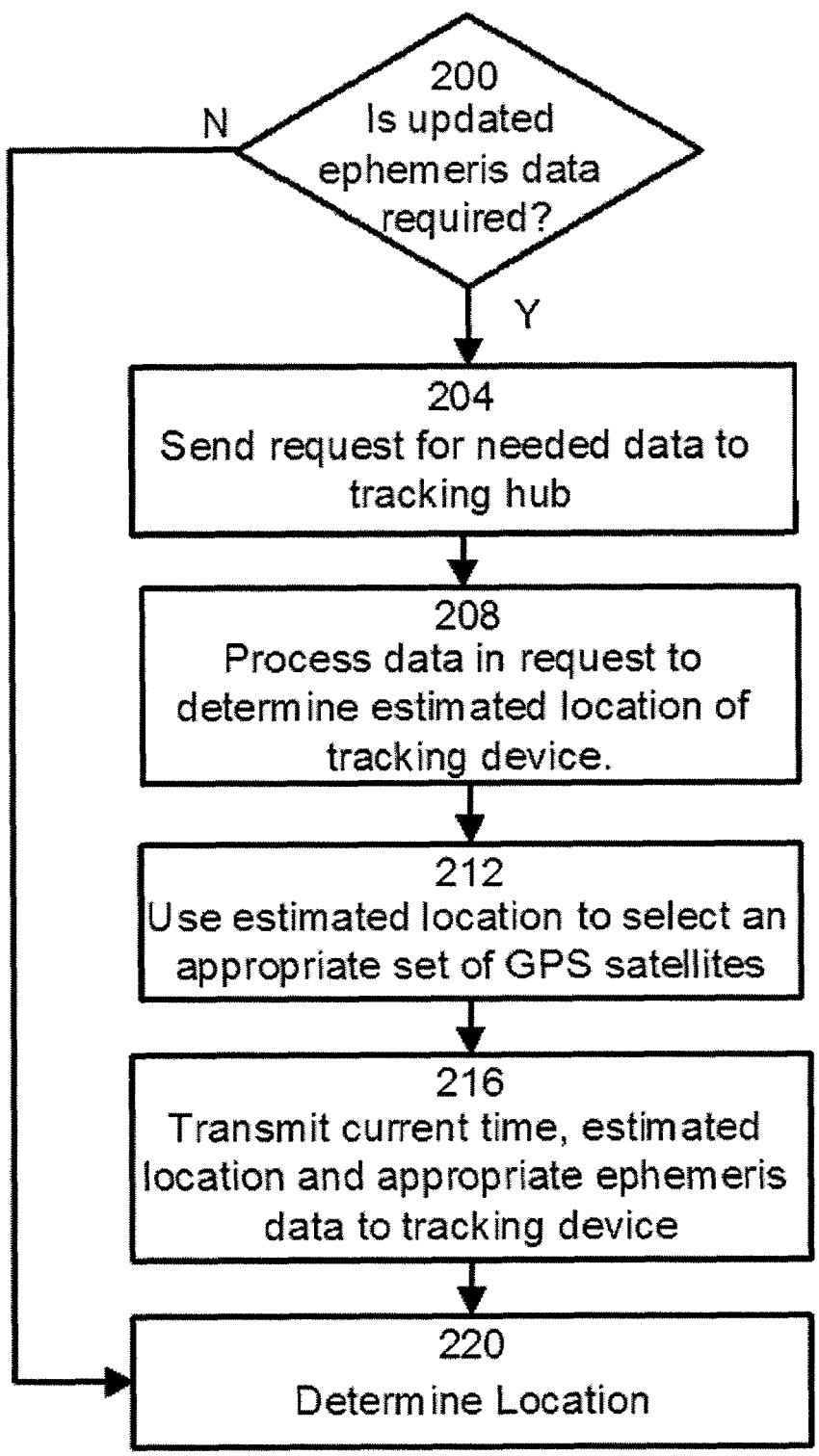
FIG. 4 shows a flowchart of the method of a location tracking device determining a location in accordance with the present invention.

FIG. 4 shows a flowchart of the process employed by a location tracking device 20 which has been requested to determine its location. The process commences at step 200 wherein the location tracking device 20 determines if the ephemeris data it presently has is still valid.

If the location tracking device 20 determines that the ephemeris data it has is out of date, due to location tracking device 20 been re-activated after some period of deactivation, or if the location tracking device 20 has not had good reception of GPS satellite signals for some period of time or for any other reason, then at step 204 location tracking device 20 sends a request message to tracking device hub 116 via wireless communications network 104.

While, assuming location tracking device 20 has good reception of signals from GPS satellites, location tracking device 20 could receive the ephemeris data from GPS satellites 108, in the present embodiment of the invention ephemeris data is preferably obtained from tracking device hub 116 as the transmission of the ephemeris data by wireless communications network 104 is faster and more robust than the transfer of the same data from GPS satellites 108.

At step 208, when tracking device hub 116 receives a request for ephemeris data from a location tracking device 20, tracking device hub 116 processes the data set of base station identifiers and the respective time delay data and makes an estimate of the location of the location tracking device 20.

At step 212, using this estimated location, tracking device hub 116 determines a minimum of three, but preferably five or more, GPS satellites 108 which should be appropriate for use by the location tracking device 20. As will be apparent to those of skill in the art, the considerations in this selection include identifying the GPS satellites 108 which should be above the horizon at the estimated location and, from this set of satellites, selecting three or more which are preferably well above the horizon (and thus less likely to be obscured by geographic or other obstructions) and which are well spaced for processing by the GPS receiver in location tracking device 20. The decision of how many GPS satellites to select is a trade off between performance and the amount of data required to be transmitted through wireless communications network 104.

At step 216, tracking device hub 116 transmits to the location tracking device 20 its the current time, the estimated location of the location tracing device 20 and valid GPS ephemeris data for each of the selected GPS satellites 108 via wireless communications network 104, the valid GPS ephemeris data being obtained from the values previously stored at tracking device hub 116. As is known by those of skill in the art, in addition to the ephemeris data, the current time is also required to locate and receive signals from GPS satellites 108. While location tracking device 20 can contain a clock, in a preferred embodiment of the invention the current time is transmitted to location tracking device 20 with the ephemeris data to correct any drift or error which may have occurred in the time of the clock.

At step 220, the location tracking device 20 determines its location, using either the data which it had at step 200, or the estimated location and valid GPS ephemeris data which it obtained from tracking device hub 116 at step 216.

If, due to poor reception of GPS satellite signals or any other reason, location tracking device 20 still cannot determine a GPS-derived location, then the estimated location produced at tracking device hub 166 can be provided as the location of the location tracking device 20, along with an indicator that this location is an estimate.

Recently, location tracking services have begun to offer enhanced functionalities such as a "geo-fence", wherein a location tracking device will report to a monitoring device or user when the location tracking device is moved outside a predefined area, or a speed watch system wherein the location tracking device will report to a monitoring device or user when the location tracking device is moving at a speed above a pre-selected speed. As discussed above, location tracking devices 20 in accordance with the present invention can easily be programmed to provide such functionalities.

However, in prior art location tracking systems, such enhanced functionalities are subject to the location tracking device being able to determine it's location via satellite based location determining infrastructure, such as the GPS system and thus such prior art systems are subject to errors or periods of inoperability when the prior art location tracking devices experience intermittent or impaired reception of satellite signals.

In contrast, with location tracking devices and the method of the present invention, location tracking devices 20 which experience intermittent or impaired reception of satellite signals and thus cannot determine their location from the satellite location receiver can employ the above-described method using the time delay data and the developed topography to determine an estimate of their location and this estimate can be employed in the enhanced functionality processes when satellite derived locations are not available. In such a case, device 20 will obtain an estimate of its present location from tracking device hub 166 and will use that estimate in processing any appropriate advanced functionalities.

Alternatively, some advanced functionalities, such as geo-fence applications, can be implemented outside devices 20 at a remote location, such as at tracking device hub 166, or in a computing device connected to tracking device hub 166. In such a case, the functionality executing at the remote location will receive location information from respective devices 20 at appropriate intervals and will evaluate the defined functionalities to determine if a defined parameter has been met to trigger the generation of an appropriate alert, alarm or other event. If a device 20 reporting to the remote location has not been able to determine its location from the satellite-based location system, then the remote location can determine an estimated location for the device 20, as described above, and can use that estimated location when evaluating the defined functionalities. As will be apparent to those of skill in the art, in such a case the defined functionalities can be defined to be appropriately responsive to the use of such estimated locations, for example by employing larger error bounds conditions when comparing the estimated location to a defined geo-fence area than the error bounds conditions which are employed when comparing a satellite-based location to the defined geo-fence area. In this manner, the advanced functionalities can operate appropriately despite the generally decreased accuracy of estimated locations.

Thus, the present invention provides more robust location determination capabilities than prior art location determination systems and advanced functionalities such as geo-fences, velocity monitoring functions or the like can be more reliably implemented.

Another advantage of the present invention is that the method of determining the estimated initial location of a location tracking device 20 can also be employed to determine the location of other devices which do not have satellite location capabilities. For example, if it is desired to locate a GSM or GSM/GPRS mobile phone handset which does not include a GPS receiver, the handset can report the identifiers for at least a selected number of the base stations of wireless communications networks which it can receive data from and respective time delay data for those base stations. In the case of a GSM handset, the required information can be transmitted as SMS text messages, while in the case of a GPRS capable handset, the required information can be transmitted in GPRS packets.

As before, tracking device hub 116 will analyze the included time delay data for each identified base station and, using the determined topography for those base stations, determine an estimated position of the mobile handset.

While this estimated position will typically not have the accuracy of a position determined from satellite location based receivers, it can still be useful for a variety of purposes, including emergency services dispatch, etc. However, as the present invention employs a topography which can include base stations from multiple network operators, the accuracy of the estimated position location can be better than systems which employ the topography of the base stations of a single network operator.

As will be understood by those of skill in the art, in many cases existing mobile handsets can be easily modified, merely by updating their firmware and/or installing a small software application on the handsets, to provide the above-described location estimation services and thus these services can readily be made available to legacy mobile handsets.

As should now be apparent to those of skill in the art, the present invention provides a system 100 and method for determining the location of a location tracking device 20. The system and method employ a satellite based location determining infrastructure, such as the GPS system, and a wireless data communications network such as a cellular voice and/or data network such as GSM/GPRS. A location tracking device which cannot easily obtain valid ephemeris data, or the like, from the satellite based location determining infrastructure requests the necessary data from a data set stored at a tracking device hub or the like, via the wireless communications network.

In the request, the location tracking device includes identifiers for at least a selected number of the base stations of wireless communications networks which it can receive data from and respective time delay data for those base stations. The tracking device hub analyzes the included time delay data for each identified base station, with the assistance of a determined topography for those base stations, to determine an estimated position of the location tracking device. This estimated location is transmitted to the location tracking device, along with the appropriate required valid ephemeris data, or the like, to allow the location tracking device to determine its location. If the location tracking device is still unable to make a location determination from the satellite based location determining infrastructure, then the estimated location can be provided.

A feature of the present invention which is believed to be particularly advantageous is that the topography of the base stations is self-determined by a process executing in the system and can include base stations from networks operated by different network operators. The topography can be updated continuously, or at selected intervals, to provide a desired degree of accuracy. The present invention does not require the expensive and potentially problematic, deployment and maintenance of infrastructure stations, such as those required for AGPS systems. Further, unlike AGPS systems, the present invention is not limited by the availability of proprietary signals or information provided by a particular service provider.

The above-described embodiments of the invention are intended to be examples of the present invention and alterations and modifications may be effected thereto, by those of skill in the art, without departing from the scope of the invention which is defined solely by the claims appended hereto.

We claim:

1. A method for determining the location of a location tracking device which employs a satellite-based positioning system, when the location tracking device does not have at least some of the ephemeris data required from the satellite-based positioning system to determine its location, comprising the steps of:

the location tracking device sending a request to a remote data device, via a wireless data communication link provided by a radio data communications network, the request including (i) a set of identifiers and (ii) respective time delay data, for a plurality of wireless network base stations which the location tracking device can receive signals from;

the remote data device receiving, via the wireless data communication link, the request from the location tracking device and processing the set of identifiers and time delay data against a determined topography of radio data communication network base stations to determine an estimated location of the wireless location tracking device;

the remote data device selecting, based upon the estimated location, ephemeris data for a plurality of satellites each of which should be visible to the location tracking device, and transmitting to the location tracking device, via the wireless data communications link, the estimated location, the current time, and the selected ephemeris data; and the location tracking device receiving, via the wireless data communications link, and employing the estimated location, the current time, and the selected ephemeris data to receive appropriate signals from the satellite-based positioning system to determine the location of the location tracking device.

2. The method of claim 1 wherein, if at the location tracking device receiving step, the location tracking device cannot determine its location from the satellite-based positioning system, the estimated location is used as the location of the location tracking device.

3. The method of claim 1 wherein the satellite-based positioning system comprises is the Global Positioning System.

4. The method of claim 3 wherein the request sent to the remote data device by the location tracking device includes no satellite-related data.

5. The method of claim 4 wherein the radio data communications network comprises a cellular telephone system.

6. The method of claim 1 wherein the radio data communications network comprises a GSM network.

7. The method of claim 1 wherein the radio data communications network comprises a GSM/GPRS network.

8. The method of claim 1 wherein the time delay data is data transmitted by the wireless network base stations which can be used to estimate the distance between the location tracking device and a radio data communication network base station.

9. The method of claim 6 wherein the time delay data comprises the time delay data transmitted by the GSM base stations.

10. The method of claim 1 wherein the determined topography is created by receiving location information from at least one location tracking device, the location information including the location of the location tracking device as determined from signals from the satellite-based positioning system and a set of identifiers and respective time delay data for a selected number of radio data communication network base stations which the location tracking device can receive signals from, the topography being determined, at periodic intervals, by processing this information to determine the locations of the radio data communication network base stations.

11. The method of claim 10 wherein the radio data communication network base stations can comprise base stations from radio data communication networks operated by different network operators.

12. The method of claim 10 wherein the radio data communication network base stations can comprise base stations from radio data communication networks employing different multiplexing techniques.

13. The method of claim 10 wherein the determined topography is updated on an ongoing basis.

14. The method of claim 1 wherein the location tracking device is configured to receive ephemeris data from at least one satellite, and to forward it to the remote data device at intervals.

15. A system for determining the location of a location tracking device which employs a satellite-based positioning system, the system comprising:

a plurality of location tracking devices, each location tracking device including a receiver for a satellite-based positioning system and a transceiver for a wireless radio data communications network, each location tracking device being configured to transmit to the wireless radio data communications network a request signal including (i) identification information corresponding to plural base stations within the wireless radio data communications network that said each location tracking device is in wireless communication with, and (ii) time delay information for each of said plural base stations; and a tracking device hub, the hub including:
 a data connection to the radio data communication network to allow communication between the tracking device hub and each of the plurality of location tracking devices;
 data storage structure configured to store data from the satellite-based positioning system, the stored data being used by the location tracking devices to determine their locations from the satellite-based location system;
 said data storage structure also configured to store a determined topography of base stations of the radio data communication network; and
 processing structure responsive to said request signal received from a location tracking device to determine from the determined topography an estimated position for the location tracking device which sent said request signal, said processing structure sending to said location tracking device which sent said request signal a reply signal comprising (i) the determined estimated position for the location of that tracking device, (ii) the current time, and (iii) ephemeris data of plural satellites within range of that tracking device.

16. A method of determining a topography of the base stations for at least one radio data communications network, comprising the steps of:

deploying plural location tracking devices within a geographic area served by the at least one radio data communications network;

receiving, at intervals, transmissions from the plural location tracking devices, the transmissions including (i) the present location of the corresponding location tracking device as determined from a satellite-based positioning system, (ii) a set of identifiers for plural base stations of the radio data communications network from which the corresponding location tracking device can receive signals, and (iii) time delay data representing the distance of the corresponding location tracking device from each base station;

processing the received location, identifiers, and time delay data to determine the distance of each of the base stations from the determined location of each tracking device; and compiling and storing at a hub coupled to the at least one radio data communications network, a topography of the locations of the base stations.

17. The method of claim 16 wherein the base stations are from radio data communications networks operated by different service providers.

18. The method of claim 17 wherein receiving, processing, and compiling steps are repeated, at periodic intervals, to update the topography.

19. The method of claim 16 further comprising the steps of:
receiving, from one of the plural location tracking devices, (i) a set of identifiers for the plural base stations, and (ii) time delay data representing the distance of the one location tracking device from each base station; and processing the received time delay data and the compiled topography to estimate the location of the one location tracking device.

20. The method of claim 19 wherein the device comprises a cellular telephone.

21. A location tracking device, comprising:
a receiver operable to receive and process satellite signals from a satellite-based positioning system;
a data transceiver operable to transmit and receive data through a radio data communications network; and
a microcontroller operable to execute at least one program to control operation of the device such that (i) the device can report, via the radio data communications network, a location determined by the receiver and a set of identifiers and respective time delay data for a plurality of radio data communications network base stations which the data transceiver of the location tracking device can receive signals from, and (ii) the device can receive from a network base station, via the radio data communications network, and process a reply signal comprising (i) the determined estimated position for the location of that tracking device, (ii) the current time, and (iii) ephemeris data of plural satellites which should be visible to that tracking device.

* * * * *